(12) United States Patent
Soto

(10) Patent No.: US 9,549,536 B2
(45) Date of Patent: Jan. 24, 2017

(54) DOG COLLAR AND LEASH WITH MAGNETIC ATTACHMENT

(71) Applicant: Isaac Soto, Cypress, TX (US)

(72) Inventor: Isaac Soto, Cypress, TX (US)

( * ) Notice: Subject to any disclaimer, the term of this patent is extended or adjusted under 35 U.S.C. 154(b) by 139 days.

(21) Appl. No.: 14/632,558

(22) Filed: Feb. 26, 2015

(65) Prior Publication Data

US 2016/0249589 A1 Sep. 1, 2016

(51) Int. Cl.
*A01K 27/00* (2006.01)

(52) U.S. Cl.
CPC ........... *A01K 27/004* (2013.01); *A01K 27/001* (2013.01)

(58) Field of Classification Search
CPC ... A01K 27/003; A01K 27/004; A01K 27/005
USPC .................. 119/772, 774, 792–799
See application file for complete search history.

(56) References Cited

U.S. PATENT DOCUMENTS

| | | | |
|---|---|---|---|
| 2,799,245 A | 7/1957 | Ruggiero | |
| 6,192,835 B1 | 2/2001 | Calhoon et al. | |
| 6,499,437 B1 * | 12/2002 | Sorensen | A01K 27/005 119/769 |
| 6,694,922 B2 | 2/2004 | Walter et al. | |
| 6,792,893 B1 * | 9/2004 | Quintero | A01K 27/004 119/794 |
| 7,640,639 B2 * | 1/2010 | de Bien | A01K 27/005 119/772 |
| 8,327,808 B2 | 12/2012 | Chirico | |
| 2008/0072849 A1 * | 3/2008 | Henderson | A01K 27/00 119/792 |
| 2009/0178627 A1 * | 7/2009 | Bentz | A01K 27/004 119/796 |
| 2014/0000533 A1 | 1/2014 | Limberis et al. | |
| 2016/0066545 A1 * | 3/2016 | Debien | A01K 27/004 119/796 |
| 2016/0215812 A1 * | 7/2016 | Durfee | F16B 45/025 |

FOREIGN PATENT DOCUMENTS

| | | | | |
|---|---|---|---|---|
| FR | WO 2011064503 A1 * | 6/2011 | ........... | A01K 27/005 |
| WO | WO 2014043297 A2 * | 3/2014 | ........... | A01K 27/005 |

* cited by examiner

*Primary Examiner* — Danielle Clerkley
(74) *Attorney, Agent, or Firm* — Egbert Law Offices, PLLC

(57) ABSTRACT

A collar and leash system is provided which allows for easy connection of the collar with the leash without the pet owner having to bend down to attach or detach the collar leash. The leash includes a tubular member having a female attachment at one end thereof. The collar of the system has a male attachment member on a side thereof. Magnetic members on the female attachment member and male attachment member serve to guide the members together so as to connect at the dogs collar. A separate release line in the leash line wound about a spool serve to quickly connect or disconnect the two components.

10 Claims, 9 Drawing Sheets

DOG COLLAR AND LEASH WITH MAGNETIC ATTACHMENT

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of pet products. More particularly, the present invention relates to the field of dog collars and leashes. Even more particularly, the present invention relates to a dog collar and leash system of which is designed for use by individuals with back problems or pain.

2. Description of Related Art Including Information Disclosed Under 37 CFR 1.97 and 37 CFR 1.98.

Many Americans are pet owners. In fact, recent statistics indicate that 62% of U.S. households own pets. These same statistics show that over $50 billion is spent annually on American pets, and a full 35% of American households owned one or more dogs.

Many dog owners (and some adventurous cat owners) spend a considerable amount of time walking their pets. While many dog owners walk their dogs one time per day, there are many dog owners who walk their dogs upward of three or four times daily. Professional dog walkers are also employed by many dog owners so that their dogs can get exercise during the time in which the dog owner is at work. The dog walk is critical for the physical and emotional health of a dog.

A standard dog leash is made of fabric material which is typically 5 to 6 feet long, depending on local ordinances requiring a maximum length. The leash has a handle on one thereof and attachment clip on opposite end thereof. The leash attachment clip must be secured on the D-ring located on the collar of the dog. This requires the dog owner to bend over to clip the leash clip on the D-ring of the collar on an often-excited dog. The same motion is required whenever the walk is over and the dog owner wishes to remove the leash from the collar of the dog.

Although most leashes and collars available on the market take a standard configuration, there have been many developments in the past related to advancements in leash and collar technology. For example, U.S. Pat. No. 2,799,245 (the '245 patent) issued on Jul. 16, 1957 to Ruggiero, describes a combination recoilable dog leash and collar. Referring generally to the figures, the dog leash and collar of the '245 patent is designed such that the leash is wound around and within the collar of the dog. In order to walk the dog, the dog owner would simply bend down and grasp the handle of the lease, pulling it outwardly from the collar of the dog.

In modern times, retractable leashes are very popular, allowing the dog to roam ahead or stay behind the dog walker a considerable distance. U.S. Pat. No. 6,694,922 (the '922 patent), issued on Feb. 24, 2004 to Walter et al., describes such a retractable leash assembly. The '922 patent describes a leash handle assembly having a housing with a grip portion, a spool assembly rotatably mounted in the housing, a trigger movably mounted to the grip portion, and a dual-position switch mounted to the housing proximate to the grip portion. The spool assembly is adapted for winding and unwinding a leash. The movable trigger is actuated to inhibit the leash from extending or retracting, and released to enable the leash to extend out of the housing in response to an external force. The spooling assembly is spring biased to cause the leash to retract in the absence of trigger actuation and the presence of a preset external force. The dual-position switch operates in a first position to lock the trigger in an actuated position and in a second position to enable the moveable trigger to operate freely. The dual-mode switch is positioned to enable a user to actuate it with the same hand that grasps the leash handle and actuates the movable trigger.

Other retractable leash developments have included multi-function leash assemblies. For example, U.S. Patent Publication No. 2014/0000533 (the '533 publication) published on Jan. 2, 2014 to Limberis et al., is one example showing a standard retractable leash having a handle and a retractable coiled leash line attached thereto. In the '533 publication, the inventors have added the function of one or more LED lights on the front end of the retractable leash assembly. In the '533 publication, one of the LED flashlights is pointed in the direction forward of the dog walker, while another is pointed towards the ground in front of the dog walker. Other specialized leash assemblies available on the market include those which have pet waste bag dispensers attached thereto.

U.S. Pat. No. 8,237,808, (the '808 patent), issued on Dec. 11, 2012 to Chirico. The '808 patent describes a universal or multipurpose dog leash. The leash can be configured to lead one dog or two dogs at the same time. The leash can be used as a hands free lead that is worn around the user's waist or shoulder. When worn around the waist, it allows 360 degrees of movement by the dog. The lead is also capable of being used as a seat restraint in a motor vehicle or as a tether. The leash is readily adjustable, suited for all size dogs, and can be especially useful for service dogs.

Other types of leash developments of included specialized leashes particularly suitable for pet owners who like to run with their dogs. U.S. Pat. No. 6,192,835 (the '835 patent), issued on Feb. 27, 2001 to Calhoon et al. The '835 patent describes a hands-free pet leash system wherein in lieu of a handle on the leash, the leashes attached to the user with a belt. Embodiments of a hands-free leash system are described, which include quick-connect/disconnect fasteners to attach a belt around a person's waist, the belt to a leash, and the leash to a collar adapter. The leash system also includes a second attachment point on the belt for attaching a second end of the leash to the belt, so that the leash may be stored on the belt when not in use on the pet, instead of dangling from the belt or from the user's hand Both of the leash attachment points on the belt are assemblies that may slide independently along the length of the belt, so that the pet may maneuver around the user without tangling or twisting of the leash system.

Common to all the patents and patent publications described above the need for the dog owner to bend down to attach and detach the leash from the collar of the dog. Many Americans suffer from back problems and/or injury wherein it is difficult if not impossible for them to bend down to accomplish this task. While the owners may be able to walk, the back injury would prevent them from walking their dog. As noted hereinabove, walking the dog is critical for both the emotional and physical health of the dog. As such, an injured American is put into the difficult situation wherein he or she cannot adequately care for the pet. As such, a need has developed for a dog collar and leash which can be easily attached and detached from the pet.

It is an object of the present invention to provide a dog collar and leash system that does not require the pet owner to bend over to attach or detach the leash to/from the collar.

It is another object of the present invention to provide a dog collar and leash system which is easy and quick to use.

It is another object of the present invention to provide a easily connectable and disconnectable dog leash that is retractable.

It is yet another object of the present invention to provide a dog collar and leash system that can be used by those with back pain or injury or other mobility issues.

These and other objects and advantages of the present invention will become apparent from a reading of the attached specification and appended claims.

BRIEF SUMMARY OF THE INVENTION

The present invention is an apparatus including a collar with a first magnetic member thereon. A leash is also provided which is suitable for coupling with the first magnetic member of the collar. The leash includes a hollow tubular member and a spool positioned at a first end of the hollow tubular member. The spool is wound with a leash line and a release line, the leash line and release line extending through the hollow tubular member. The leash also includes a magnetic attachment assembly affixed to both the lease line and the release line. The magnetic attachment assembly is suitable for releasably receiving the first magnetic member of the collar.

In an embodiment of the present invention, the magnetic attachment assembly includes a housing having an open end, the housing being affixed to the release line. A second magnetic member is positioned interior of the housing. A pair of arms is hingedly affixed to the housing. One of the pair of arms is affixed to leash line. Each of the pair of arms have inwardly extending ends. The pair of arms may be movable from a first position wherein the inwardly extending ends are essentially clear of the open end of the housing, to a second position wherein the inwardly extending ends extend partially over the open end of the housing.

In an embodiment of the present invention, the first magnetic member of the collar has a stem connecting the first magnetic member to the collar. The stem extends between the inwardly extending ends of the pair of arms when the pair of arms are in the second position. The first magnet is sized so as to be secured within the open end of the housing by the inwardly extending ends of the pair of arms when the pair of arms is in the second position.

In embodiment of the present invention, the leash line and release line are retractably wound on the spool. The leash member also includes a brake movable so as to prevent the release line from being unwound from the spool.

In one embodiment of the present invention, the hollow tubular member is rigid.

In an embodiment of the present invention, the collar has a weighted portion opposite the first magnetic member. The weighted portion has a greater weight than the weight of the first magnetic member.

In an embodiment of the present invention, each of the first magnetic member and the second magnetic member may be one of a permanent magnet, an electromagnet, and a magnetic material.

In an embodiment of the present invention one of the pair of arms has a screw thereon adjacent the second magnetic member so as to bias the pair of arms in the first position.

In an embodiment of the present invention, the leash line has a length greater than a length of the release line. The release line is affixed at one end to the magnetic attachment assembly and at another end to the leash line.

The present invention is also an apparatus including a collar having a male attachment member extending outwardly therefrom, and a leash suitable for attachment to the male attachment member. The leash includes a tubular member being rigid or semirigid, a handle on one end of the tubular member, and a female attachment member on another end of the tubular member. The female attachment member is suitable for releasably receiving the male attachment member of the collar.

In embodiment of the present invention, the male attachment member has a first magnetic member thereon and the female attachment member includes a housing having an open end, a second magnetic member positioned interior of the housing, and a pair of arms hingedly affixed to the housing. Each of the first magnetic member and second magnetic member may be the one of a permanent magnet, electromagnet, and a magnetic material.

In an embodiment of the present invention, the pair of arms may be movable from a first position wherein the male attachment member is free to move in or out of the open end of the housing, to a second position wherein a portion of the male attachment member is secured within the open end of the housing.

In an embodiment of the present invention, the collar has a counterweight on a side thereof opposite the male attachment member, the counterweight having a weight greater than the weight of the male attachment member.

In an embodiment of the present invention, a spool is affixed to the tubular member adjacent the handle. The spool is wound with a leash line extending through the tubular member and attached to the female attachment member. A release line may be wound on the spool which also extends through the tubular member and is attached to the female attachment member. A brake is positioned on or adjacent the spool and is movable so as to prevent the release line from being unwound from the spool.

In an embodiment of the present invention, application of the brake creates slack in the leash line and tension in the release line. The tension in the release line causes the female attachment member to release the male attachment member therefrom.

In an embodiment of the present invention the weight or counterweight on the collar may be a weighted side or portion of the diameter of the collar.

In an embodiment of the present invention, the release line has a length shorter than the leash line. The release line is connected to the leash line in a position away from the female attachment member.

This foregoing Section is intended to describe, in generality, the preferred embodiment of the present invention. It is understood that modifications to this preferred embodiment can be made within the scope of the present invention.

As such, this Section should not to be construed, in any way, as limiting of the broad scope of the present invention. The present invention should only be limited by the following claims and their legal equivalents.

DETAILED DESCRIPTION OF THE INVENTION

Figure 1:
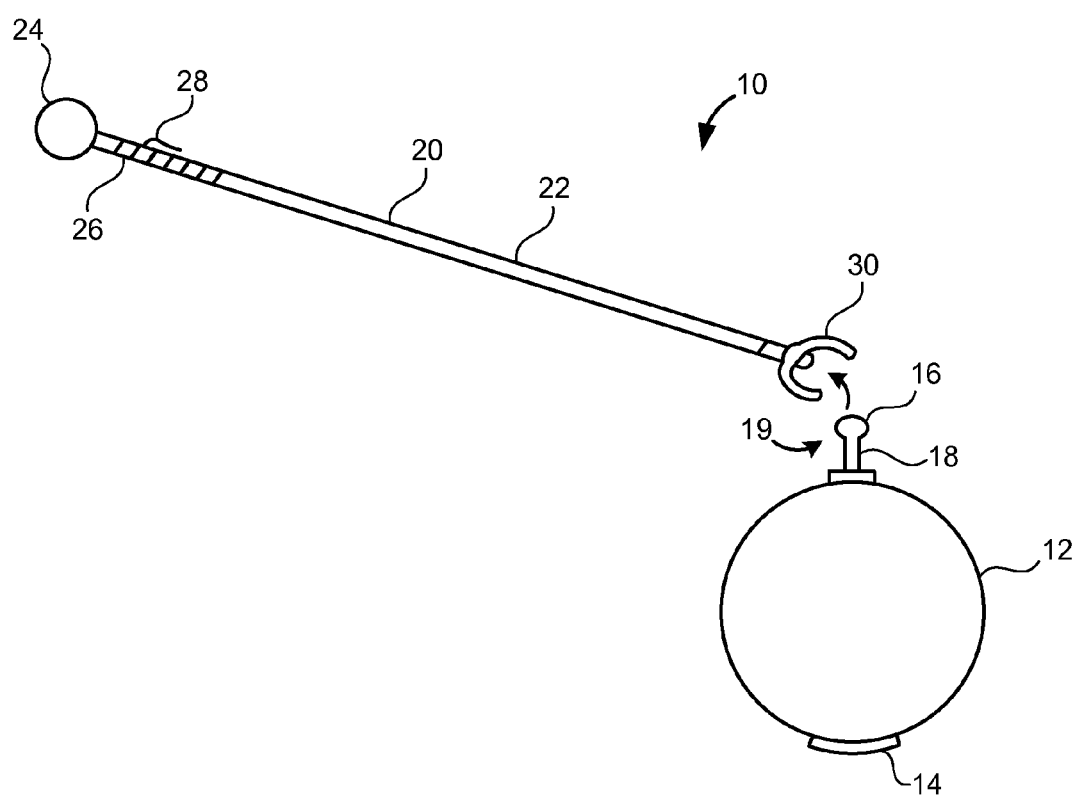
FIG. 1 is a side view showing the attachment of the collar and leash in the system of the present invention.

Referring to FIG. 1, there is shown a side view of the collar and leash system 10 of the present invention. In FIG. 1, the leash is shown as being attached to the collar. FIG. 1 shows the collar 12. The collar 12 is a generally round piece of fabric as is standard in the art. The collar 12 has a counterweight 14 on one end thereof. Opposite the counterweight 14 is the first magnetic member 16 and the stem 18 which connects the first magnetic member 16 to the collar 12. Collectively, the first magnetic member 16 and stem 18 comprise the male attachment member 19 of the collar 12. The counterweight 14 serves to keep the collar on a position on the dog wherein the male attachment member 19 is pointing in an upward direction. Attachment of the leash of the collar and leash system 10 of the present invention is made much easier when the male attachment member 19 is in an upward position.

Also shown is the leash 20 of the collar and leash system 10 of the present invention. The leash 20 includes a hollow tubular member 22. The hollow tubular member 22 is preferably of a rigid or semi-rigid material. A spool 24 is positioned at one end of hollow tubular member 22. A handle 26 is formed on the hollow tubular member 22 adjacent the spool 24. Various configurations of the handle 26 can be contemplated, including use of the spool 24 as the handle 26. A brake member 28 is positioned adjacent the handle 26.

Opposite the spool 24, a female attachment assembly 30 is shown. The female attachment assembly 30 is suitable for attachment to the male attachment member 19 of the collar 12. Due to the rigid nature of the hollow tubular member 22, it can be seen how the leash 20 can be attached to the collar 12 without the dog owner having to bend down to attach the two items together.

Figure 2:
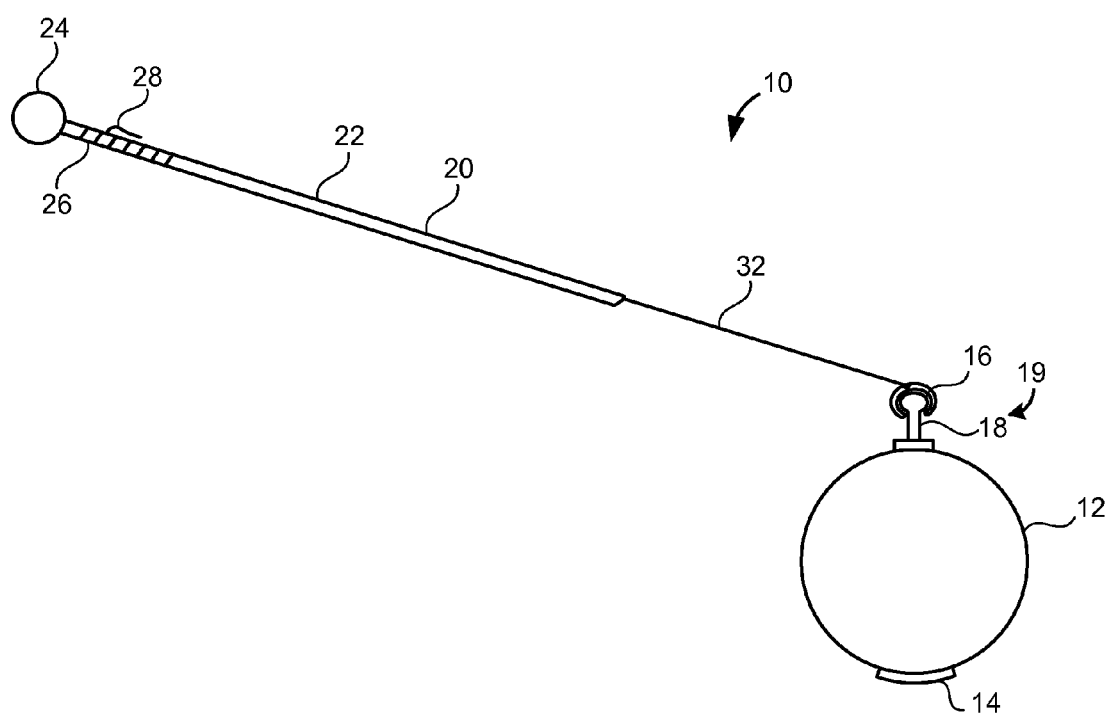
FIG. 2 is a side view showing the retractable nature of the leash in the system of the present invention.

Referring to FIG. 2, there is shown a side view of the collar and leash system 10 of the present invention wherein the female attachment assembly 30 of the leash 20 has been attached to the male attachment member 19 of the collar 12. As can be seen in FIG. 2, the leash is retractable. Lines 32 are shown as extending from the hollow tubular member 22 so as to attach the female attachment assembly 30. The lines 32 comprise a leash line and a release line, as will be described hereinafter below. The lines 32 extend into the interior of the hollow tubular member 22 and are wound about the spool 24. As can be appreciated, due to the fact that there are two lines, two spools can be located within the housing of the spool 24. As will be described hereinbelow, the brake 28 can be used to disconnect the female attachment assembly 30 from the male attachment assembly 19. Preferably, the extended length of the lines 32 and the hollow tubular member 22 would equal approximately 5 to 6 feet. This is in accordance with local ordinances requiring a maximum length of a pet leash.

Figure 3A:
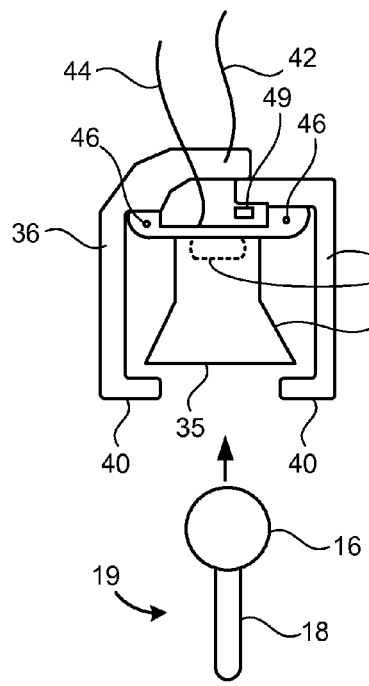
FIGS. 3A-3C are detailed views showing the steps of the attachment and detachment of the collar from the leash of the present invention.
Figure 3B:
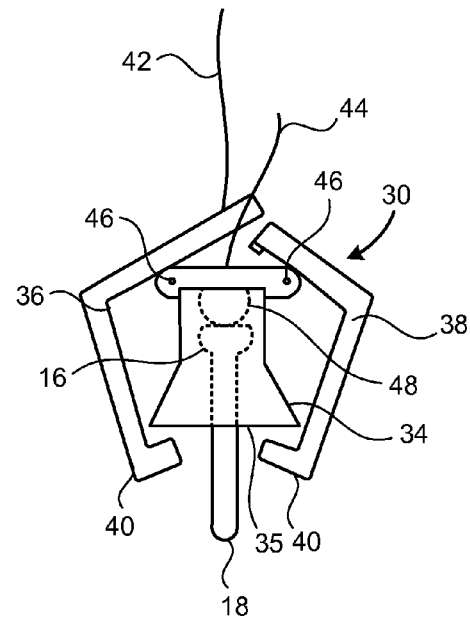
Figure 3C:
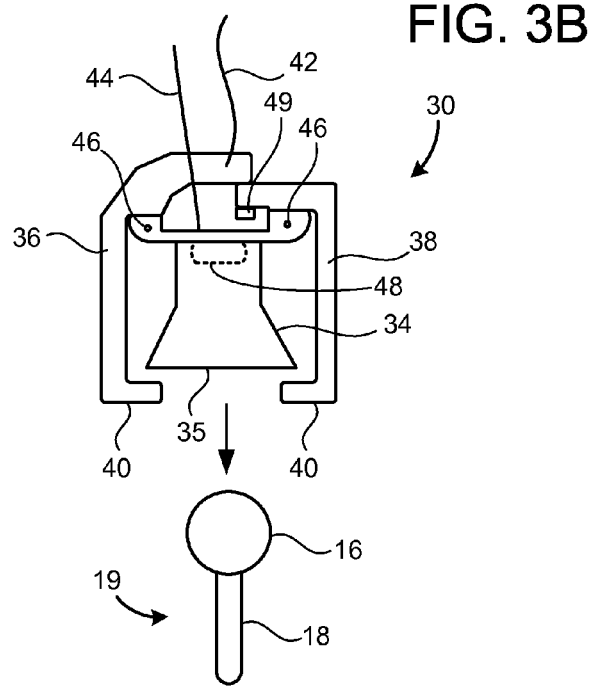

Referring to FIGS. 3A-3C, detailed views showing attachment and detachment of the female attachment assembly 30 from the male attachment member 19 are shown. FIG. 3A depicts a situation as shown in FIG. 1, wherein the user is attempting to attach the female attachment assembly 30 of the leash 20 to the male attachment member 19 of the collar 12. FIG. 3A shows a detailed view of how the male attachment member 19 includes a first magnetic member 16 and a stem 18. As can be seen in FIG. 3A, the first magnetic member 16 is larger in diameter and shape than the stem 18.

FIG. 3A also shows how the female attachment assembly 30 includes a bell shaped housing 34. The bell shaped housing 34 has an open end 35. Hingedly attached to the bell shaped housing 34 are a first arm 36 and a second arm 38. The first arm 36 and second arm 38 are attached at hinge points 46. Each of the first arm 36 and second arm 38 have an inwardly extending end 40. In FIG. 3A, the inwardly extending ends 40 are essentially clear of the opening 35 of the bell shaped housing 34. These inwardly extending ends 40 need not be completely clear of the open end 35 of the bell shaped housing 34, but must be clear enough of the opening 35 so as to allow the first magnetic member 16 to be received within the open end 35 of the bell shaped housing 34.

In FIG. 3A, it can be seen how the leash line 42 is connected to a top of the first arm 36 opposite the inwardly extending end 40. A release line 44 is shown as being connected to the top end of the bell shaped housing and not to either of the first arm 36 or second arm 38.

The interior of the bell shaped housing 34 includes the second magnetic member 48. A metal screw 49 is provided on one of the first arm 36 or second arm 38. In FIG. 3A, the screw 49 is shown as being connected to the second arm 38. The purpose of the screw is to be attracted by the second magnetic member 48 so as to bias the first arm 36 and second arm 38 in a position wherein the inwardly extending ends of the first arm 36 and second arm 38 are essentially clear of the open end 35 of the bell shaped housing 34.

As used herein the term "magnetic member" can mean either of a permanent magnet, an electromagnetic, or a magnetic material. Importantly, it is necessary for the first magnetic member 16 to be attracted to the second magnetic member 48. It is also important for the screw 49 to be attracted to the second magnetic member 48 in the concept of the present invention.

As illustrated in FIG. 3A, when the user wants to attach the leash and collar of the system 10 of the present invention, he or she simply positions the female attachment member assembly 30 of the leash adjacent the male attachment member 19 of the collar 12. The attraction between the first magnetic member 16 and second magnetic member 48 will help to guide the first magnetic member 16 of the male attachment member 19 into the interior of the bell shaped housing 34 such that the two magnetic members contact.

FIG. 3B shows the next step in the connection process wherein the first arm 36 and second arm 38 are moved to a second position wherein the inwardly extending ends 40 partially cover the open end 35 of the bell shaped housing 34. In FIG. 3B, it can be seen how the first magnetic member 16 has contacted the second magnetic member 48 within the bell shaped housing 34. Movement of the arms 36 and 38 to this position is accomplished when tension is applied to the leash line 42. Because leash line 42 is connected to the first arm 36, any tension thereon will cause the first arm 36 and second arm 38 to rotate about the hinges 46 so as to cause the inwardly extending ends of the arms to cover the open end 35 the bell shaped housing 34. As such, when the dog is pulling on the leash, it merely makes the connection between the collar and leash more secure. In this instance, there is some slack shown in the release line 44, while tension is shown in the leash line 42. With the collar 12 and leash 20 securely connected, the dog owner can take his or her dog for a walk and not have to worry about the collar becoming disconnected from the leash.

FIG. 3C shows the situation wherein the dog owner wishes to disconnect the leash 20 from the collar 12. As shown in FIG. 3C, there is now a tension in the release line 44, while there is slack in the leash line 42. The slack in the leash line 42 allows the first arm 36 and second arm 38 to return to the first position wherein the inwardly extending ends 40 of the arms are now essentially clear of the open end 35 of the bell shaped housing 34. With the inwardly extending ends 40 clear of this opening, the first magnetic member 16 is allowed to exit the bell shaped housing 34. The process by which the release line is tensioned is described hereinbelow. The screw 49 also aids in the return of the arms 36 and 38 to this position.

Figure 4:
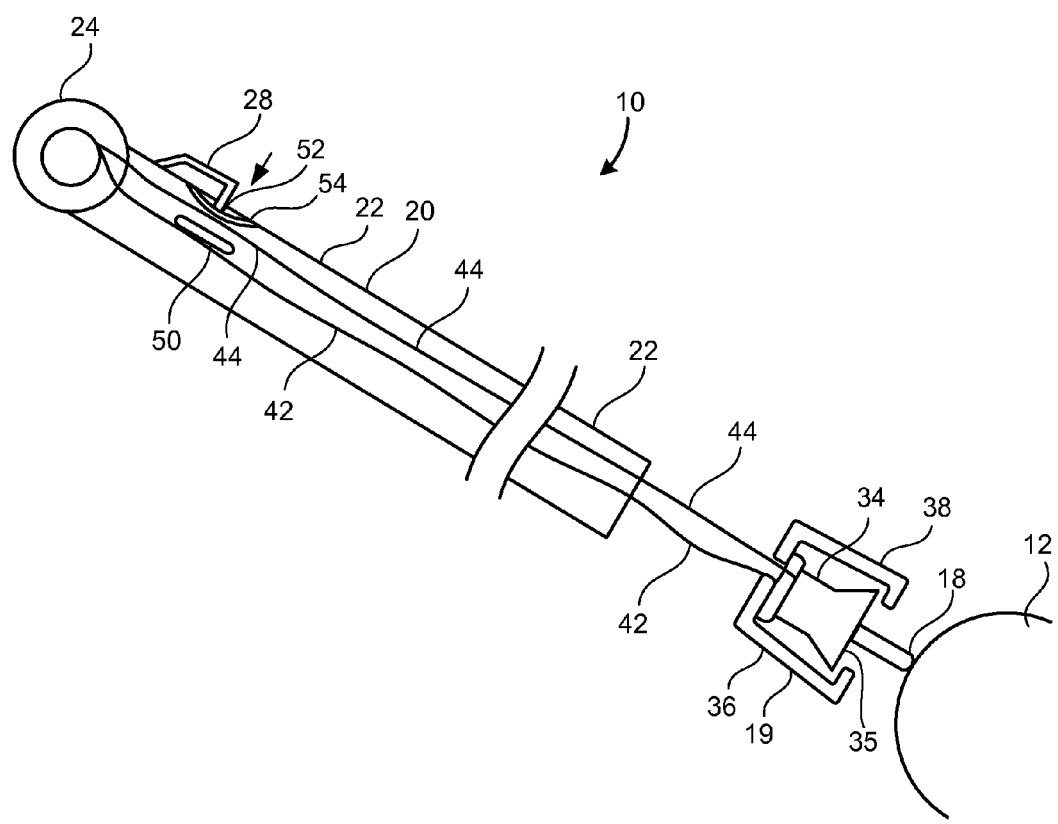
FIG. 4 shows a transparent schematic view of the collar and leash system of the present invention, wherein the leash line and release line details are shown.

Referring to FIG. 4, there is shown a detailed sectional view of the collar and leash system 10 of the present invention. In FIG. 4, it can be seen how the leash line 42 and release line 44 extend from the female attachment member 19 through the interior of the hollow tubular member 22 and around the spool 24. The spool 24 is suitably spring-loaded so as to wind when the components are released. Importantly, FIG. 4 shows how the brake 28 of the present invention functions.

A separator 50 is shown in the hollow tubular member 22. The separator 50 separates the path of the leash line 42 from the path of the release line 44. The release line 44 is shown as extending over a top surface of the separator 50. The brake 28 has an end 52. The end 52 moves downwardly into the interior of the hollow tubular member 22 when the brake is pushed. The end 52, or a pad or contact surface 54 below the end 52 contacts the release line 44, pushing it up against the separator 50. With the release line immobilized, a tension is created in the release line, while slack is created the leash line 42. As described hereinabove, this causes the first arm 36 and second arm 38 to return to the first position wherein the inwardly extending ends 40 are essentially clear of the open end 35 of the bell shaped housing 34, allowing the male attachment member 19, or specifically the first magnetic member 16, to move outwardly of the bell shaped housing 34.

Figure 5:
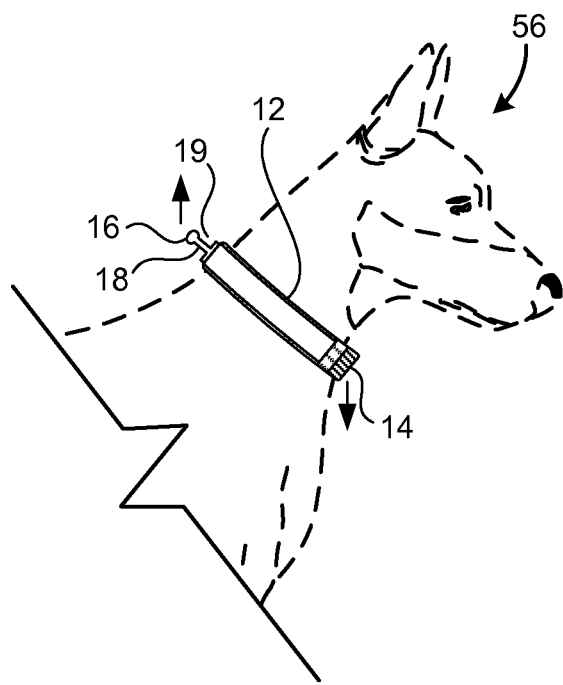
FIG. 5 shows an isolated view of the collar of the system of the present invention as worn by a dog.

Referring to FIG. 5, there is shown a dog 56 wearing the collar 12 of the system 10 of the present invention. As can be seen, the counterweight 14, which weighs more than the male attachment member 19, keeps the male attachment member 19 in a position on top of the dog's neck. This allows for easy attachment of the leash 20 of the present invention to the male attachment member 19 of the collar 12.

Figure 6:
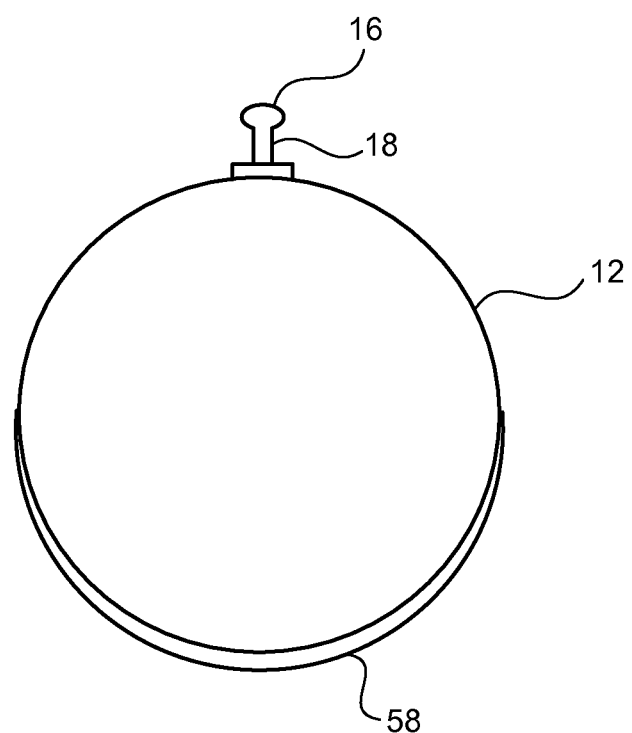
FIG. 6 shows an embodiment of the collar of the present invention wherein the counterweight is a weighted side of the collar.

FIG. 6 shows an alternative embodiment of the collar 12 of the present invention wherein instead at a single counterweight, there is a distributed weight 58 along the lower diameter of the collar 12. As can be seen, the distributed weight is greater along the very bottom of the collar 12 and tapers off as it reaches an equatorial line of the collar 12. It is thought that such distributed weight 58 may be more comfortable for the dog than a single weight hanging at the bottom of the collar.

Suitable clips or buckles may be provided on the collar 12 for removal and installation of the collar on the dog. Such buckles and clips are well known in the art.

As can be appreciated, the collar and leash system 10 of the present invention allows for very simple connection and disconnection of the collar 12 with the leash 20. The dog owner merely needs to position the female attachment assembly 30 of the leash adjacent the male attachment member 19 of the collar, and the magnetic members therein will guide the two components together so as to connect to the leash 20 with the collar 12. At this point, the lines 32 will unwind from the spool 24 and the collar 12 and leash 20 will be instantly secured.

When the user wishes to disconnect the collar 12 from the leash 20, he or she simply applies the brake 28 so as to disconnect the components. Various other configurations of the brake 28 can be utilized, including buttons positioned on the spool. Further, the system 10 of the present invention could likely function without the use of the magnetic members 16 and 48. However, it has been found that the use of magnetic members aids in the quick and easy attachment of the collar 12 with the leash 20. Further, the magnetic members provide enough resistance to allow for tension to be applied to the leash line so as to close the arms secure the male attachment member within the bell shaped housing.

Figure 7:
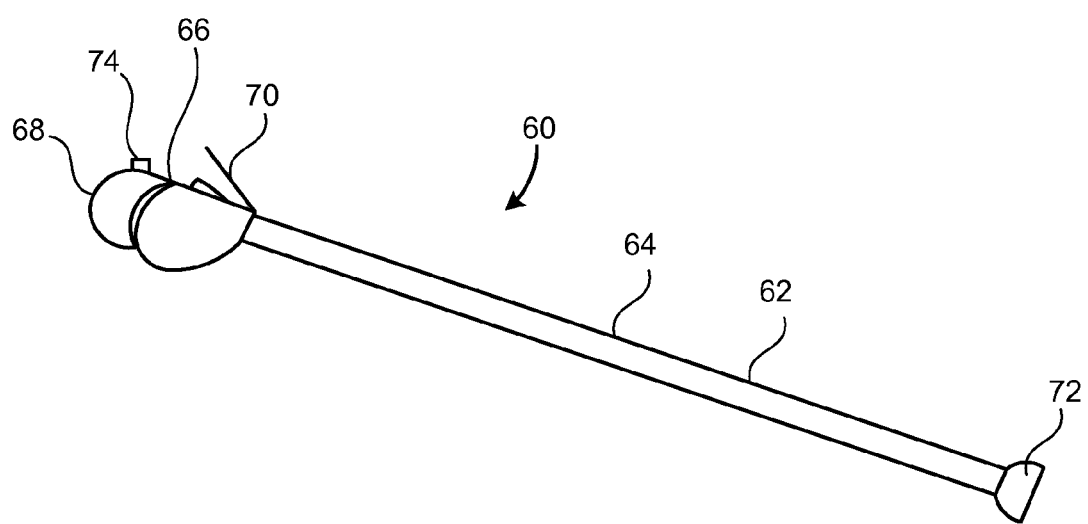
FIG. 7 is a side view showing the leash of the system of the preferred embodiment of the present invention.

Referring to FIG. 7, there is shown a side view of the leash 62 of the preferred embodiment of the system 60 of the present invention. The leash 62 of the preferred embodiment the present invention is similar to the leash shown in the previous embodiments. The leash 62 has a hollow tubular member 64 and a spool 66 attached at one end thereof. The spool 66 in the preferred embodiment of the present invention is a similar to a conventional spool having a handle 68 thereon.

In a preferred embodiment of the present invention, the brake 70 is positioned on the spool 66 and not on the tubular member 64. The female attachment member 72, which will be described hereinbelow, is positioned opposite the handle 68 on the hollow tubular member 64. The female attachment member 72 differs slightly in the preferred embodiment of the present invention.

As can be seen in FIG. 7, the spool 66 of the leash 62 of the preferred embodiment of the present invention has one or more buttons 74 on the handle 68 thereof. These buttons 74 can be used to let in or out the leash line of the leash 62 of the present invention.

Figure 8:
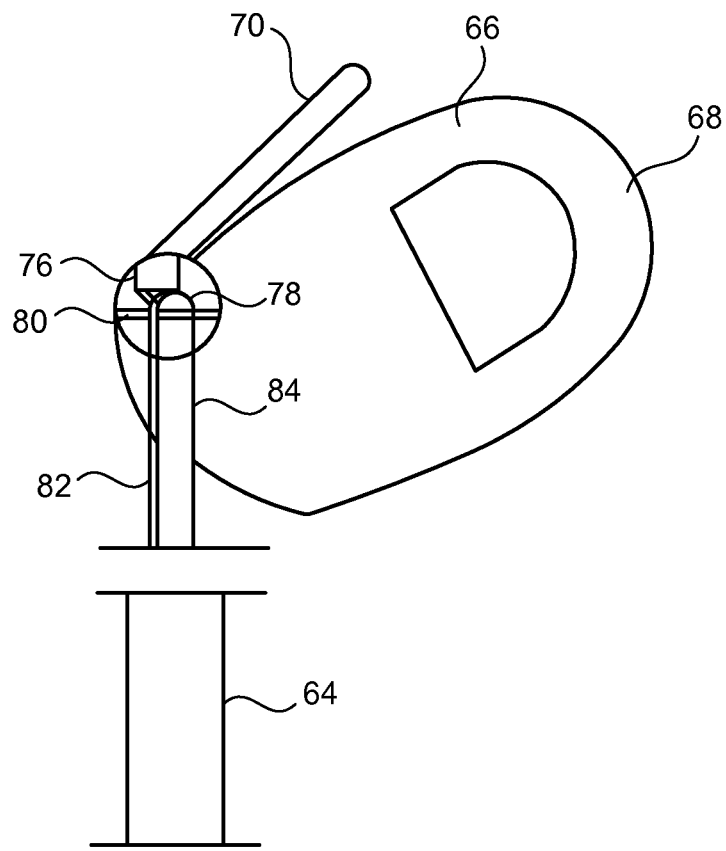
FIG. 8 is a schematic view showing the handle of the leash of the system of the preferred embodiment of the present invention.

Referring to FIG. 8, there is shown a detailed view of the brake 70 in the preferred embodiment of the present invention. In FIG. 8, it can be seen how the spool 66 has a hole 78 through which the release line 82 and the leash line 84 exit. The brake 70 has a lever handle which when depressed, causes a depressor 76 to move downwardly so as to pin the release line 82 against an underlying surface 80.

In FIG. 8, it can be seen how, in the preferred embodiment the present invention, the release line 82 has a thickness greater than that of the leash line 84. The greater thickness of the release line 82 allows for the release line 82 to be trapped by the depressor 76 of the brake 70, while allowing the leash line 84 to pass freely between the depressor 76 and the underlying surface 80. This orientation avoids the need for a separator as used in the previously described embodiments. As can be seen in FIG. 8, the release line 82 and leash line 84 pass into the hollow tubular member 64 as in previous embodiments.

Figure 9:
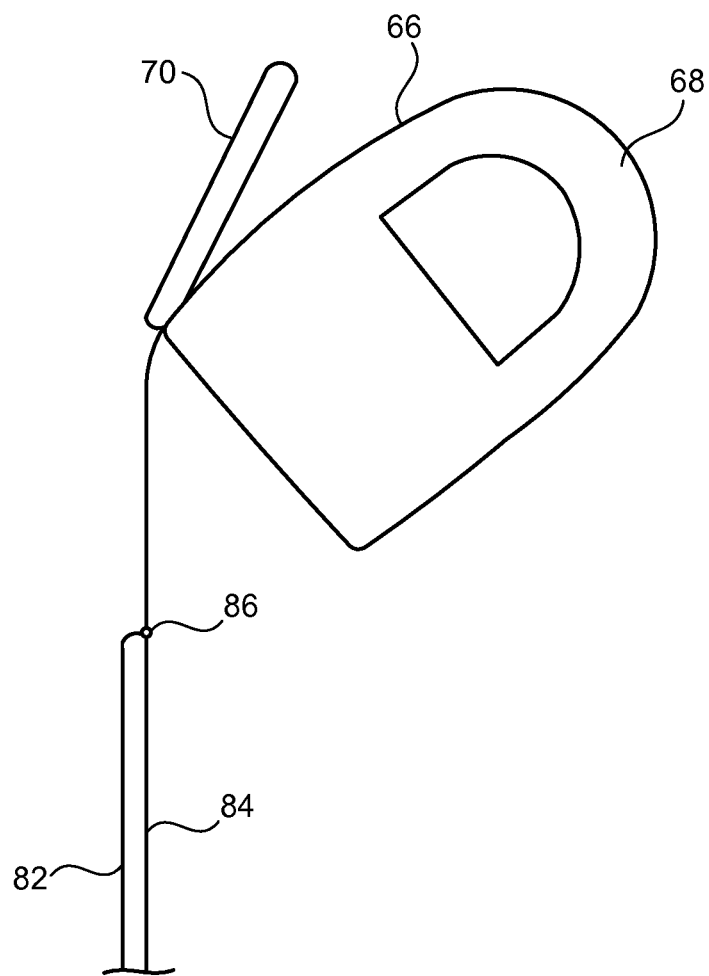
FIG. 9 is a side view showing the connection of the release line and the leash line of the system of the preferred embodiment of the present invention.

FIG. 9 shows a schematic view of the connection between the release line 82 and the leash line 84. Importantly, in a preferred embodiment of the present invention, the leash line 84 has a length substantially greater than that of the release line 82. In FIG. 9, it be seen how the release line 82 connects to the leash line 84 at a connection point 86, the release line 82 having been fully unwound from the spool 66. As such, the release line 82 can only be braked, and thus the connection between the collar and leash released, when the release line 82 and leash line 84 are retracted significantly into the spool 66 of the leash 62. Preferably, the leash line 84 has a length of approximately 16 feet, while the release line 82 has a length of only 3 feet. This would help prevent accidental release of the dog when the leash line 84 is fully let out from the spool. Preferably, each of the lines are 100 percent high density nylon and the leash line has a diameter of 2 mm while the release line has a diameter of 3 mm.

Figure 10:
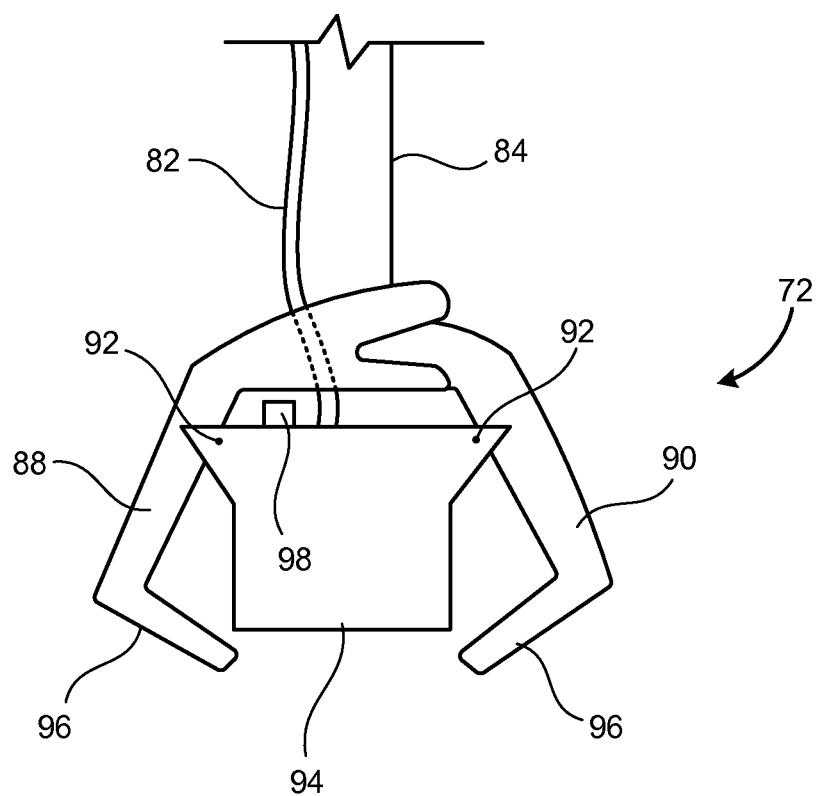
FIG. 10 is a detailed view showing the female attachment member of the preferred embodiment of the present invention.

FIG. 10 shows a detailed view of the female attachment member 72 of the preferred embodiment of the present invention. The females member 72 is very similar to the previously described embodiment, however in the preferred embodiment, the first arm 88 and second arm 90, along with the bell shaped housing 94 are generally a one piece construction. The first arm 88 and second arm 90 are hingedly connected at hinges 92 to the bell shaped housing 94. Similarly, a screw 98 is provided on top surface of the bell shaped housing 94 so as to bias the arms in an open position. As with the previous embodiments, the release line 82 is connected to the bell shaped housing 94, while the leash line 84 is connected to the first arm 88. In the preferred embodiment the present invention, the female attachment for 72 also has inwardly extending arms 96 extending from the first and second arms 88 and 90. The female attachment member 72 in the preferred embodiment of the present invention similarly has magnetic members disposed therein and operates in the same general fashion as the previously-described embodiment.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising: a collar having a first magnetic member thereon; and a leash suitable for coupling with said first magnetic member of said collar, said leash comprising:
   a hollow tubular member;
   a spool positioned at a first end of said hollow tubular member, said spool being wound with a leash line and a release line, said leash line and said release line extending through said hollow tubular member; and
   a magnetic attachment assembly affixed to each of said leash line and said release line, said magnetic attachment assembly suitable for releasably receiving said first magnetic member of said collar, said magnetic attachment assembly comprising:
   a housing having an open end, said housing affixed to said release line; a second magnetic member positioned interior of said housing; and a pair of arms hingedly affixed to said housing, one of said pair of arms affixed to said leash line, each of said pair of arms having an inwardly extending end.

2. The apparatus of claim 1, said pair of arms movable from a first position wherein said inwardly extending ends are essentially clear of said open end of said housing to a second position wherein said inwardly extending ends partially over said open end of said housing.

3. The apparatus of claim 1, said first magnetic member of said collar having a stem connecting said first magnetic member to said collar, said stem extending between said inwardly extending ends of said pair of arms when said pair of arms are in said second position, said first magnetic member being sized so as to be secured within said open end of said housing by said inwardly extending ends of said pair of arms when said pair of arms is in said second position.

4. The apparatus of claim 1, each of said first magnetic member and second magnetic member selected from the group consisting of: a permanent magnet, an electromagnet, and a magnetic material.

5. The apparatus of claim 1, one of said pair of arms having a screw thereon adjacent said second magnetic member so as to bias said pair of arms in said first position.

6. The apparatus of claim 1, said leash line and said release line being retractably wound on said spool, the leash member further comprising;
   a brake movable so as to prevent said release line from being unwound from said spool.

7. The apparatus of claim 6, wherein application of said brake creates slack in said leash line and tension in said release line, said tension in said release line causing said second magnetic member to release said first magnetic member.

8. The apparatus of claim 1, said hollow tubular member being rigid.

9. The apparatus of claim 1, said collar having a weighted portion opposite said first magnetic member, said weighted portion having a weight greater than a weight of said first magnetic member.

10. The apparatus of claim 1, said leash line having a length greater than a length of said release line, said release line being affixed at one end to said magnetic attachment assembly and at another end to said leash line.

* * * * *